United States Patent
Cheng

[19]

[11] Patent Number: 6,161,859

[45] Date of Patent: Dec. 19, 2000

[54] FOOT PEGS FOR MOTORCYCLES

[76] Inventor: Chun Ling Cheng, No. 9-3, Lane 516, Park Road, Tainan City, Taiwan

[21] Appl. No.: 09/216,966

[22] Filed: Dec. 21, 1998

[51] Int. Cl.$^7$ ..................................................... B62H 1/08
[52] U.S. Cl. ............................................. 280/291; 74/564
[58] Field of Search ................... 280/291, 288.4; 74/564; 180/219; 296/75

[56] References Cited

U.S. PATENT DOCUMENTS

| | | | |
|---|---|---|---|
| 4,546,993 | 10/1985 | Walker | 280/291 |
| 4,591,179 | 5/1986 | Nakamura | 280/291 |
| 4,797,791 | 1/1989 | Burchick | 280/291 |
| 5,454,580 | 10/1995 | Lin | 280/291 |
| 5,482,307 | 1/1996 | Lin | 280/291 |
| 5,638,723 | 6/1997 | Lin | 280/291 |

FOREIGN PATENT DOCUMENTS

| | | | |
|---|---|---|---|
| 372260 | 5/1932 | France | 280/291 |
| 1062222 | 4/1954 | France | 280/291 |
| 272719 | 6/1927 | United Kingdom | 280/291 |

*Primary Examiner*—J. J. Swann
*Assistant Examiner*—F. Zeender
*Attorney, Agent, or Firm*—Rosenberg, Klein & Lee

[57] ABSTRACT

A foot peg for a motorcycle includes a base member having a passage for a shaft extending therethrough and a cover securely mounted to the top of the base member and having a plurality of slots defined therethrough. A friction member is received between the base member and the cover, and has a plurality of ribs extending from the top thereof so as to extend through the slots of the cover. The shaft has a tapered toothed flange and the inner periphery defining the passage has a tapered toothed potion so as to engage with the tapered toothed flange of the shaft so that the base member together with the friction member can be positioned at an angle relative to the horizontal plane.

8 Claims, 12 Drawing Sheets

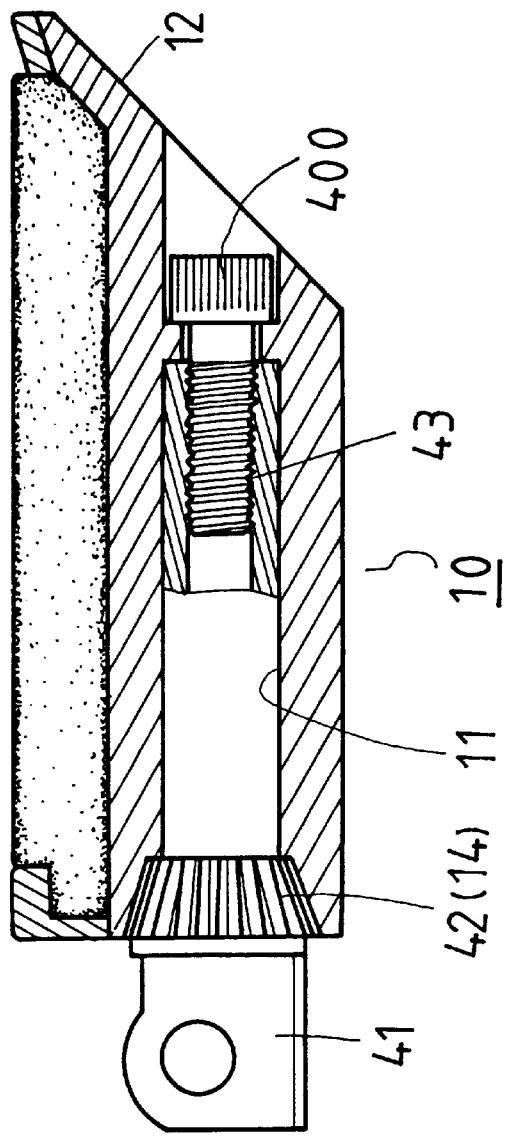
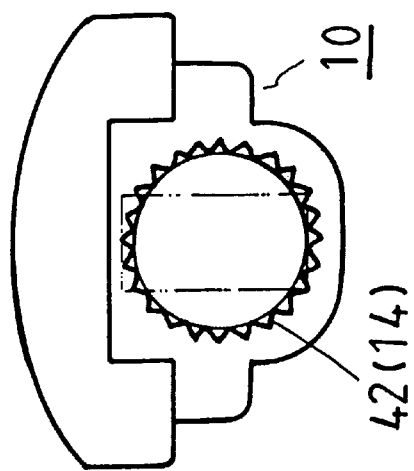
FIG. 10
FIG. 9

FOOT PEGS FOR MOTORCYCLES

FIELD OF THE INVENTION

The present invention relates to a foot peg, and more particularly, to an improved foot peg for a motorcycle and having a replaceable friction member received in the base member which has slots the ribs of the friction member extend therethrough.

BACKGROUND OF THE INVENTION

A conventional foot peg of a motorcycle comprises a rod which is fixedly connected to the motorcycle and has a friction sleeve mounted thereto so that when the rider's shoe steps on the friction sleeve, his/her foot will not slip. In order to provide a better friction function, the friction sleeve has a serrated outer surface and the passage in the friction sleeve is sized to tightly fit to the rod. However, the serrated outer surface will be worn out after being used for a period of time and the worn friction sleeve is to be replaced. It is difficult to remove the friction sleeve from the rod because they are engaged so tightly. Furthermore, the conventional foot peg is circular in cross section so that, basically, there has a small contact surface between the foot peg and the bottom of the shoe of the rider. Although a rectangle-shaped friction sleeve is developed, the angle relative to the ground thereof cannot be adjusted.

The present invention intends to provide a foot peg whose friction member can be conveniently replaced and the angle of the friction member relative to the ground can be adjusted. By the foot peg of the present invention, the inherent shortcomings can be well resolved.

SUMMARY OF THE INVENTION

In accordance with one aspect of the present invention, there is provided a foot peg for a motorcycle, comprising a base member having a passage defined longitudinally therethrough for a shaft inserted therein, a cover securely mounted to the top of the base member and having a plurality of slots defined therethrough, and a friction member received between the base member and the cover. The friction member has a plurality of ribs extending from the top thereof and the ribs extend through the slots of the cover.

The object of the present invention is to provide a foot peg for a motorcycle wherein the friction member can be easily replaced.

Another object of the present invention is to provide a foot peg for a motorcycle wherein the ribs extending through the slots of the cover can be adjusted at an angle relative to the horizontal plane.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 9 is an end elevational view of the foot peg as shown in FIG. 7;

FIG. 10 is a side elevational view, partly in section, of the foot peg as shown in FIG. 7;

DETAILED DESCRIPTION OF THE PREFERRED EMBODIMENTS

Figure 1:
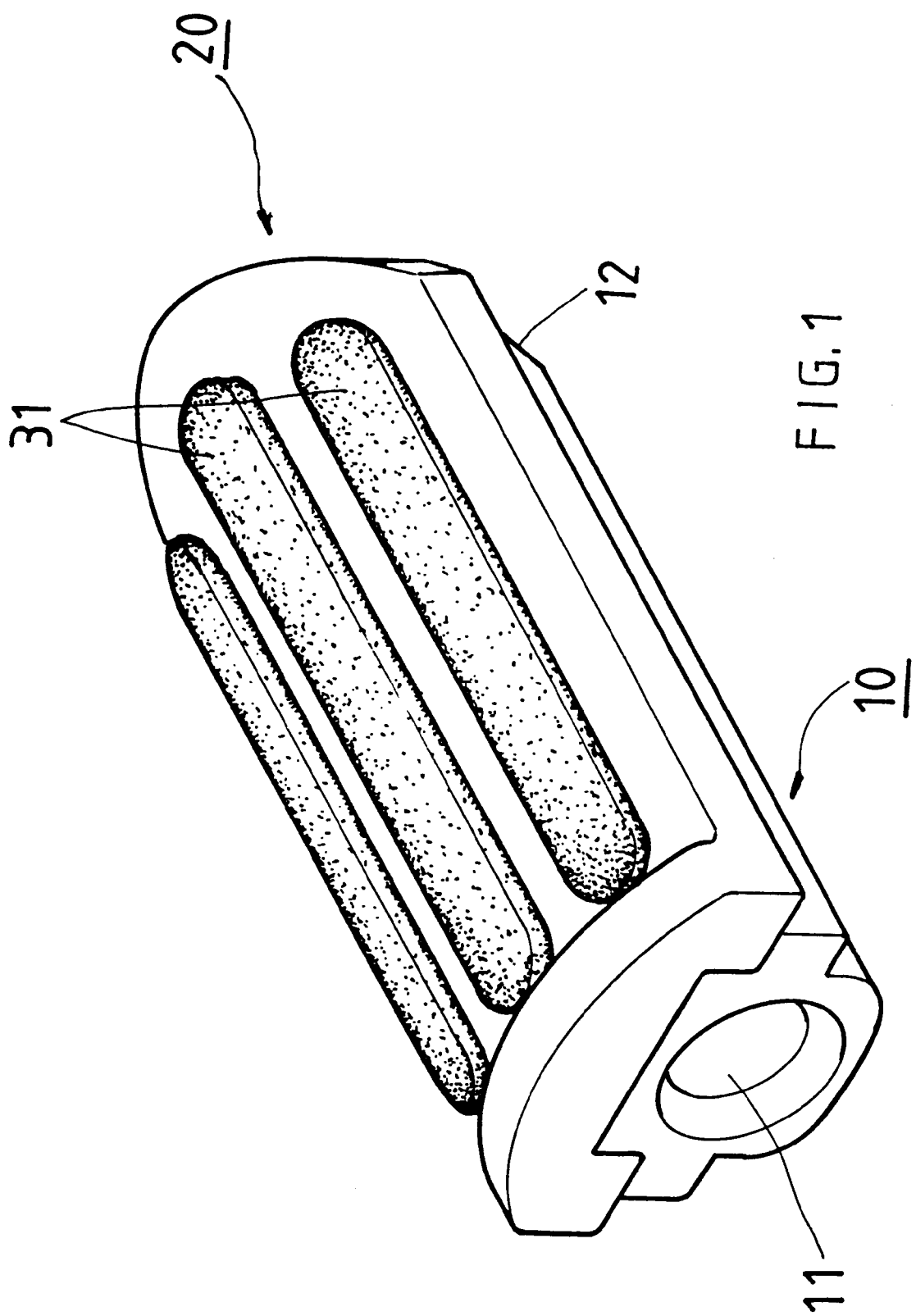
FIG. 1 is a perspective view of the first embodiment of the foot peg in accordance with the present invention.
Figure 2:
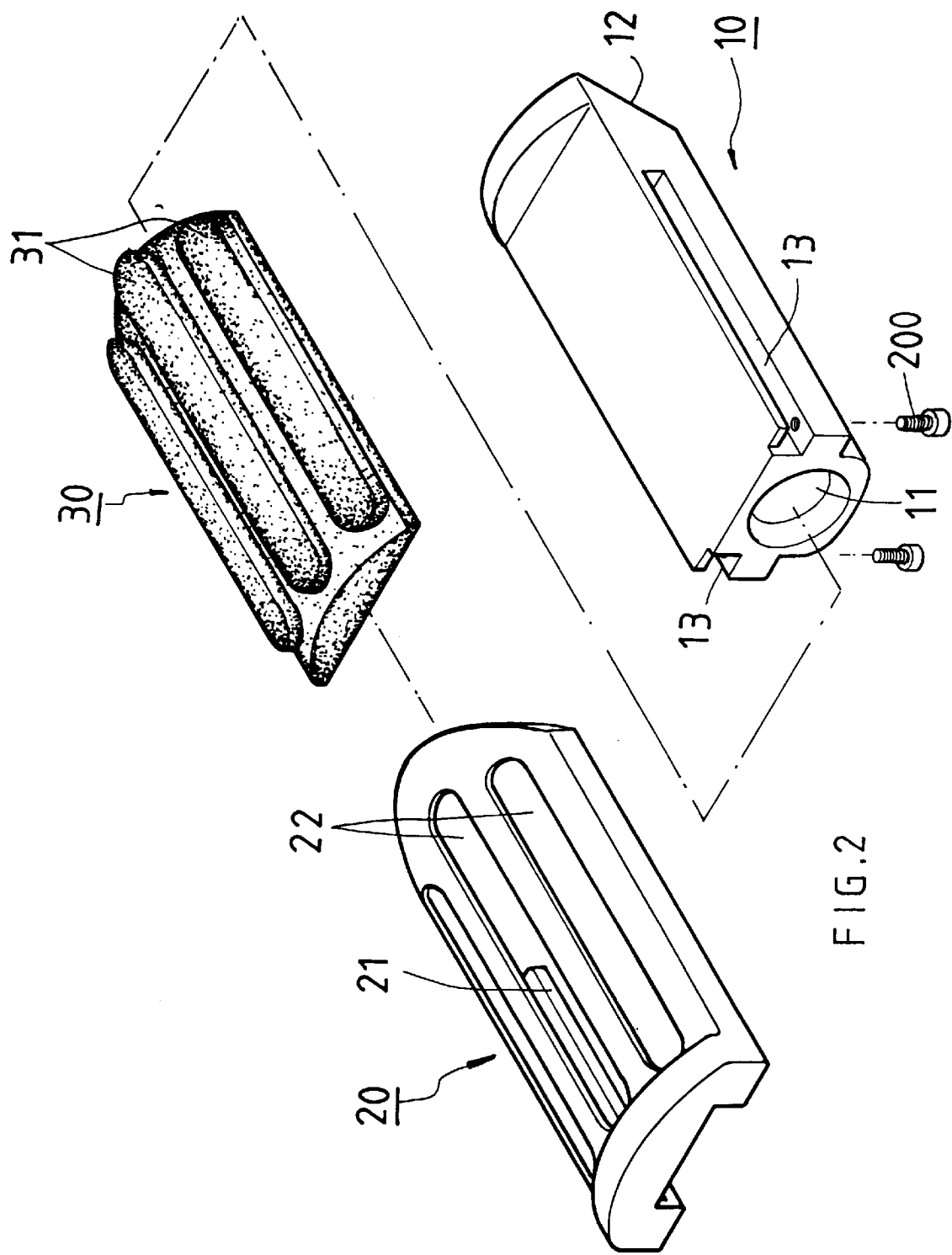
FIG. 2 is an exploded view of the foot peg as shown in FIG. 1 in accordance with the present invention.
Figure 4:
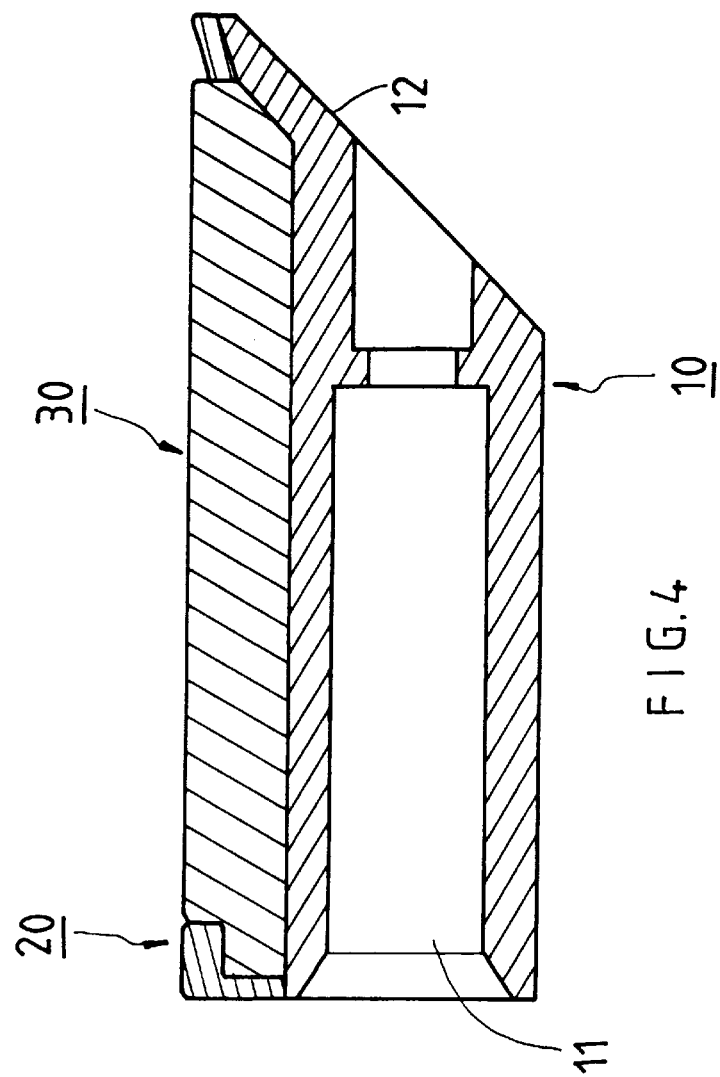
FIG. 4 is a side elevational view, partly in section, of the foot peg as shown in FIG. 1.
Figure 3:
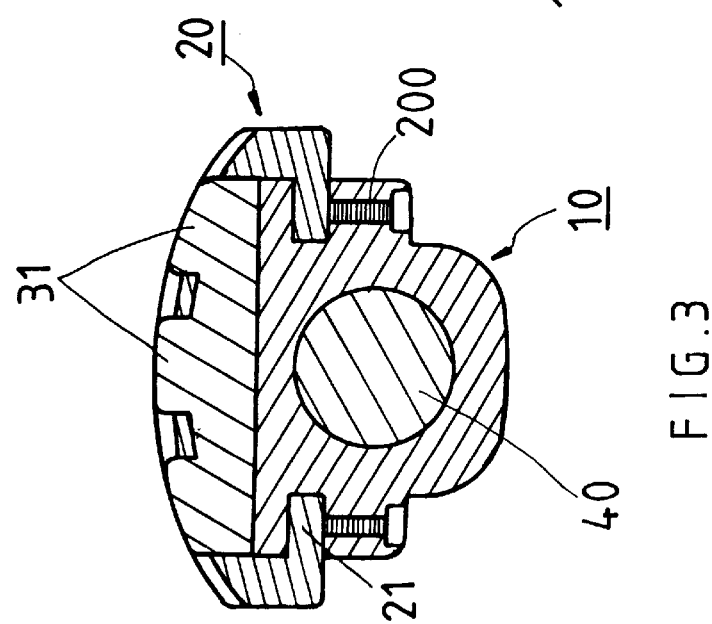
FIG. 3 is an end elevational view, partly in section, of the foot peg as shown in FIG. 1.

Referring to FIGS. 1 to 4, the foot peg in accordance with the present invention comprises a base member 10 having a passage 11 defined longitudinally therethrough for a shaft 40 inserted from the first end of the base member 10, the second end of the base member 10 is an inclined end 12. The base member 10 further has two grooves 13 defined in two sides thereof.

A cover 20 securely mounted to the top of the base member 10 and has two side walls extending from two opposite sides thereof, each of the side walls having a rail 21 extending laterally inward therefrom so that the rails 21 are securely inserted into the two grooves 13 and positioned by extending two bolts 200 through the base member 10 and the grooves 13 and contacting against the rails 21. The cover 20 has a plurality of slots 22 defined therethrough.

Figure 5:
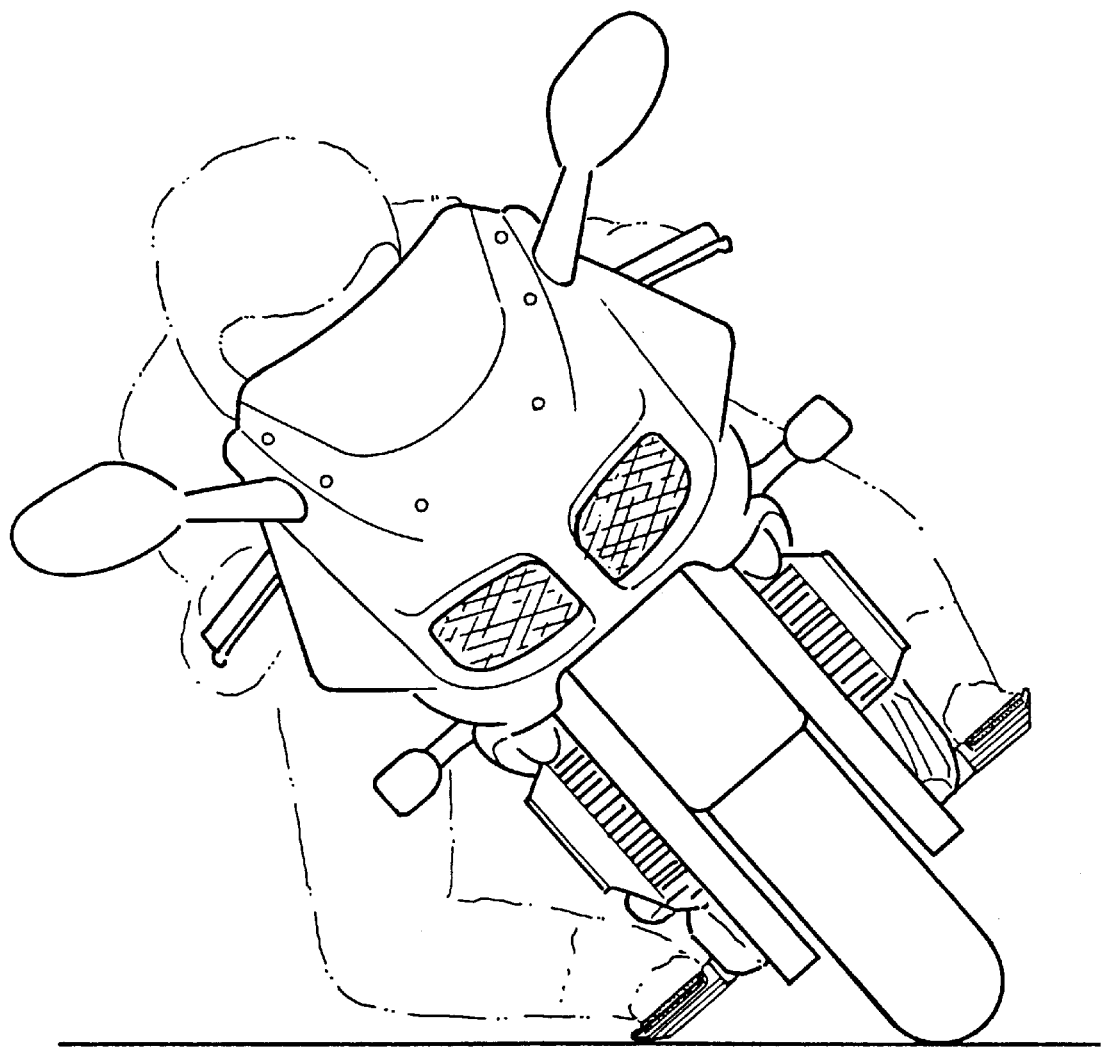
FIG. 5 is an illustrative view to show the inclined end of the base member of the foot peg as shown in FIG. 1 prevents the foot peg from contacting the ground when the motorcycle turns.
Figure 6:
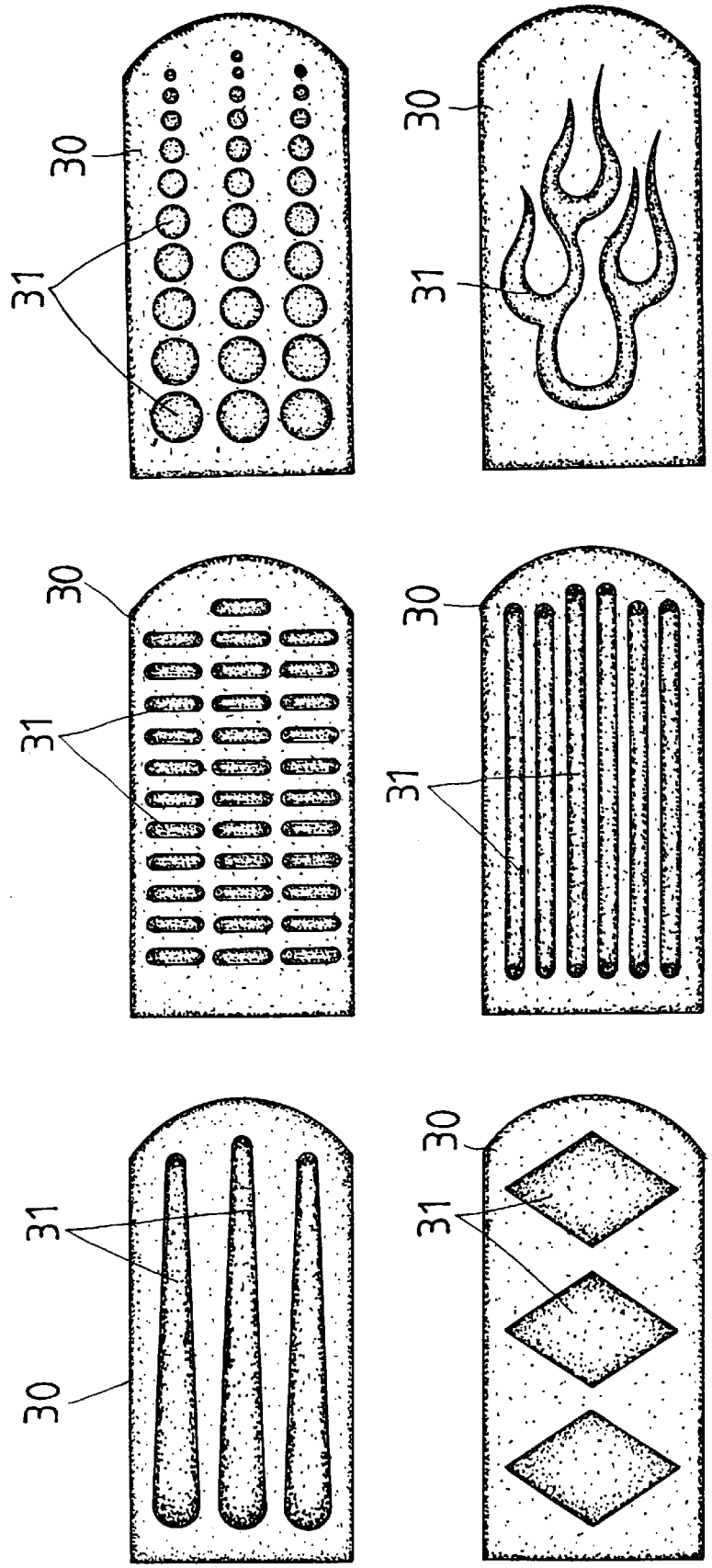
FIG. 6 shows six different types of friction members of the first embodiment off the foot peg of the present invention.
Figure 7:
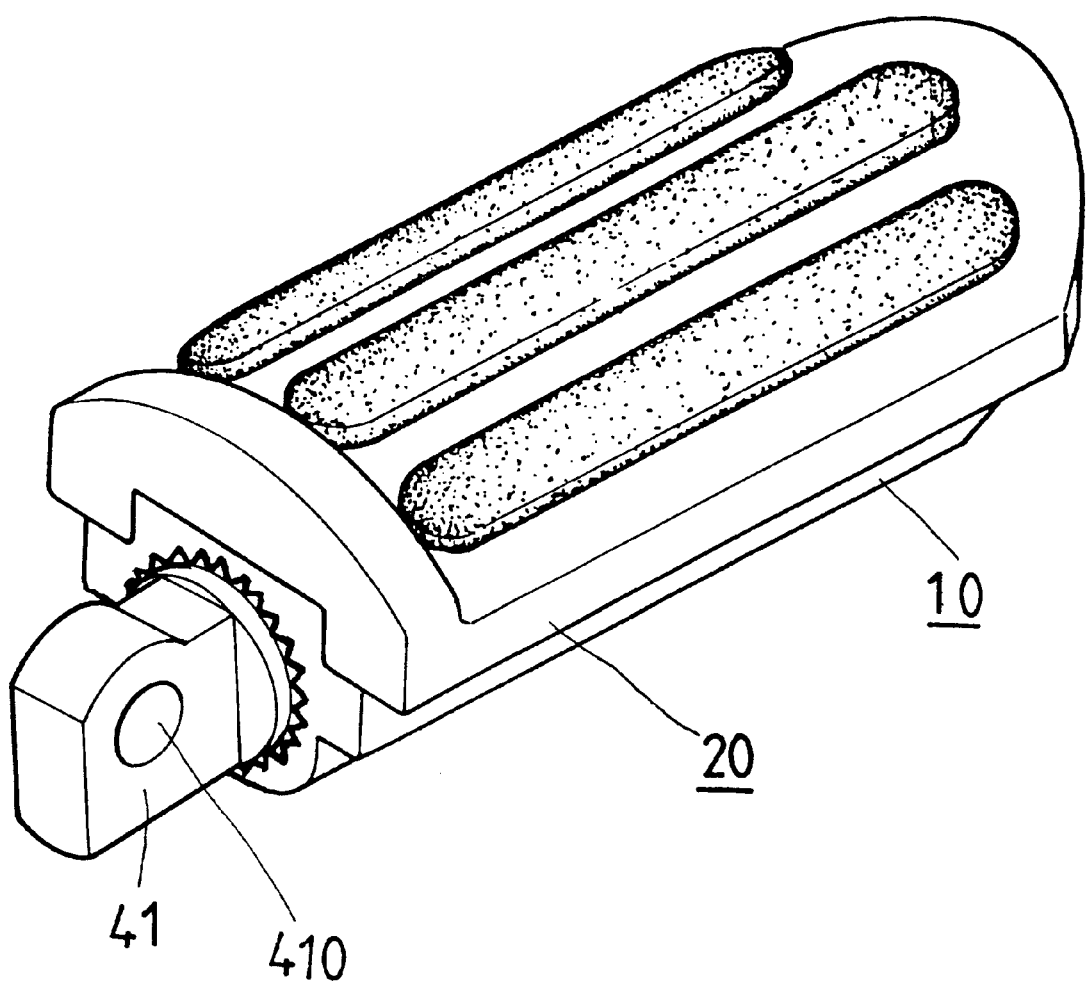
FIG. 7 is a perspective view of the second embodiment of the foot peg in accordance with the present invention.
Figure 8:
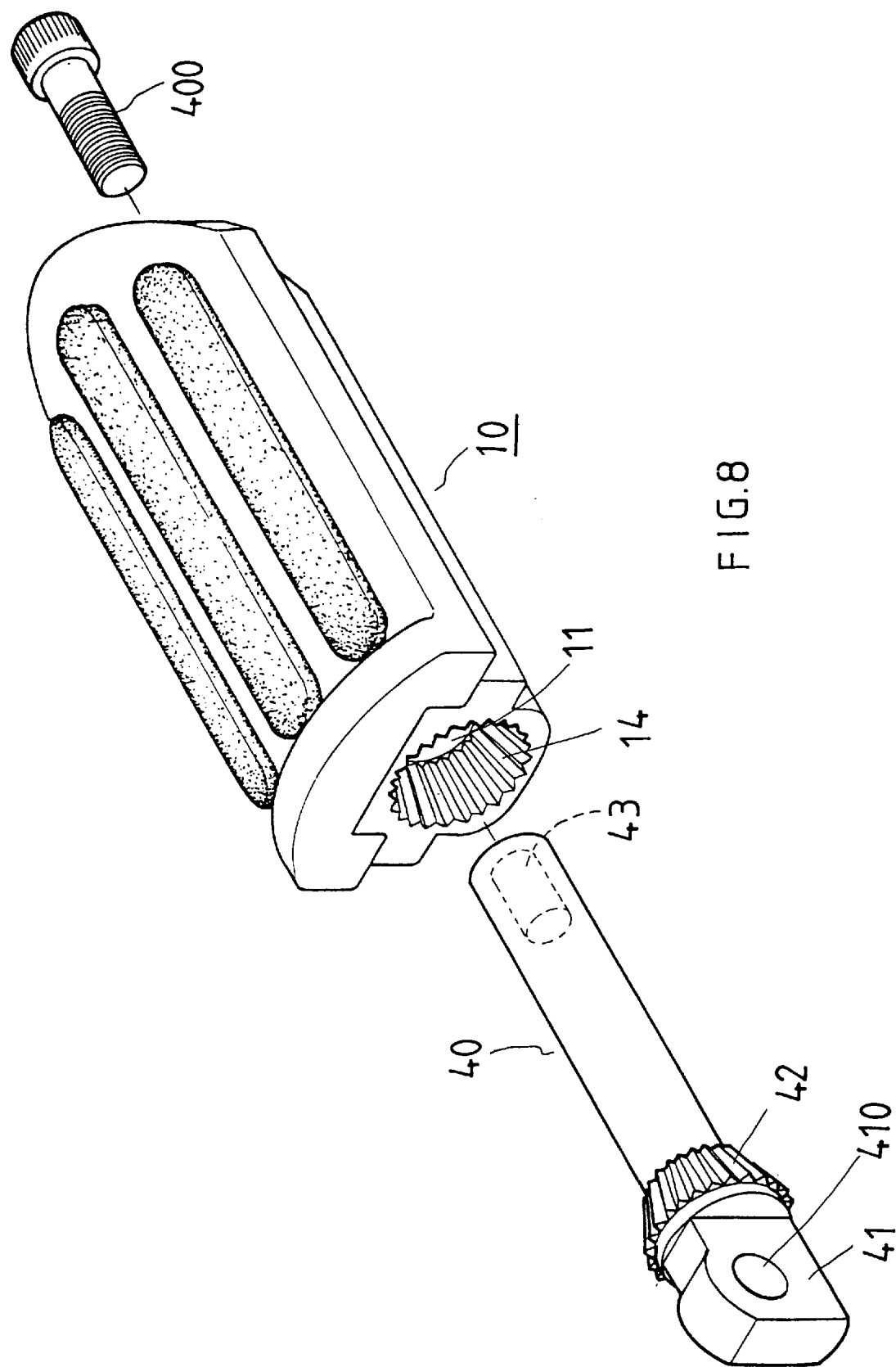
FIG. 8 is an exploded view of the foot peg as shown in FIG. 7 in accordance with the present invention.

A friction member 30 is engaged between the two side walls of the cover and received between the base member 10 and the cover 20. The friction member 30 has a plurality of ribs 31 extending from the top thereof and the ribs 31 extend through the slots 22 of the cover 20. FIG. 6 shows the friction members 30 having various types of ribs 31. FIG. 5 shows that when the motorcycle turns, the inclined end 12 of the base member 10 prevents the base member 10 from impacting against the ground.

FIGS. 7 to 10 show the second embodiment of the foot peg of the present invention, wherein the base member 10 has a passage 11 defined longitudinally therethrough for a shaft 40 inserted from the first end of the base member 10, the second end of the base member 10 is an inclined end 12 (see FIG. 10). The shaft 40 has a tapered toothed flange 42 extending radially outward from the first end thereof, the periphery defining the passage 11 having a tapered toothed portion 14 defined in the first end thereof so as to engage with the tapered toothed flange 42 of the shaft 40. The shaft 40 has a threaded recess 43 defined in the second end thereof so as to engage with a bolt 400 from the inclined end 12 of the base member 10. The shaft 40 has a pull end 41 extending longitudinally from the first end thereof and the pull end 41 has an aperture 410 defined therethrough so that the shaft 40 is conveniently pulled from the passage 11 by pulling the pull end 41.

Figure 11:
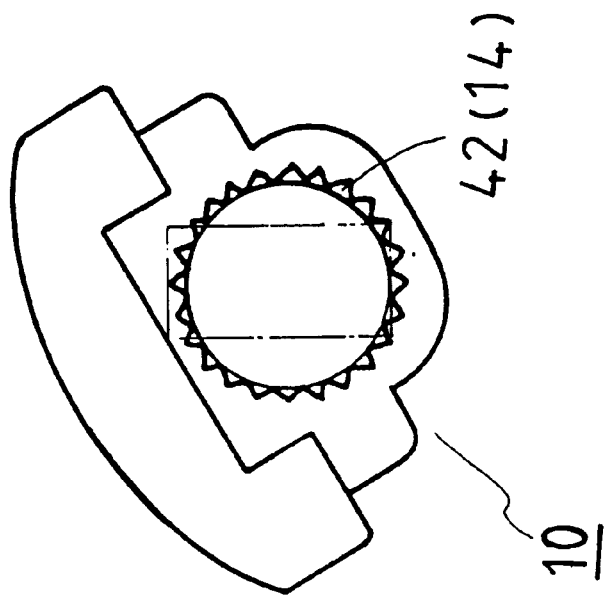
FIGS. 11 and 12 show the base member is positioned at two different positions at two angles relative to the horizontal plane.
Figure 12:
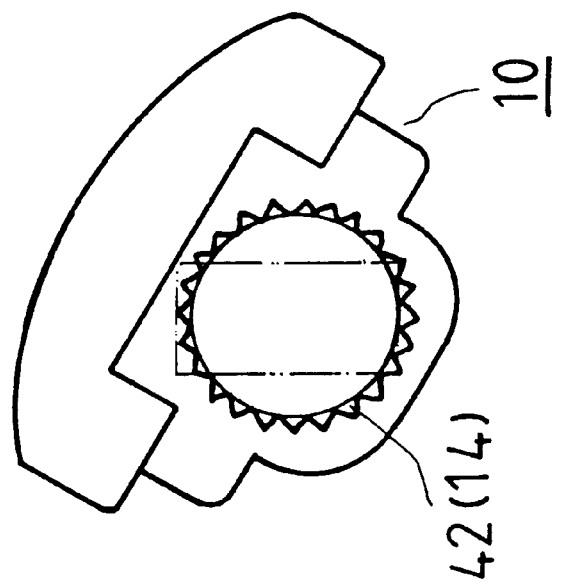

Referring to FIGS. 11 and 12, the base member 10 can be adjusted to be positioned at an angle relative to the horizontal plane such as the ground, that is to say, the angle relative to the ground of the base member 20 can be adjusted according to the needs of the rider.

Figure 13:
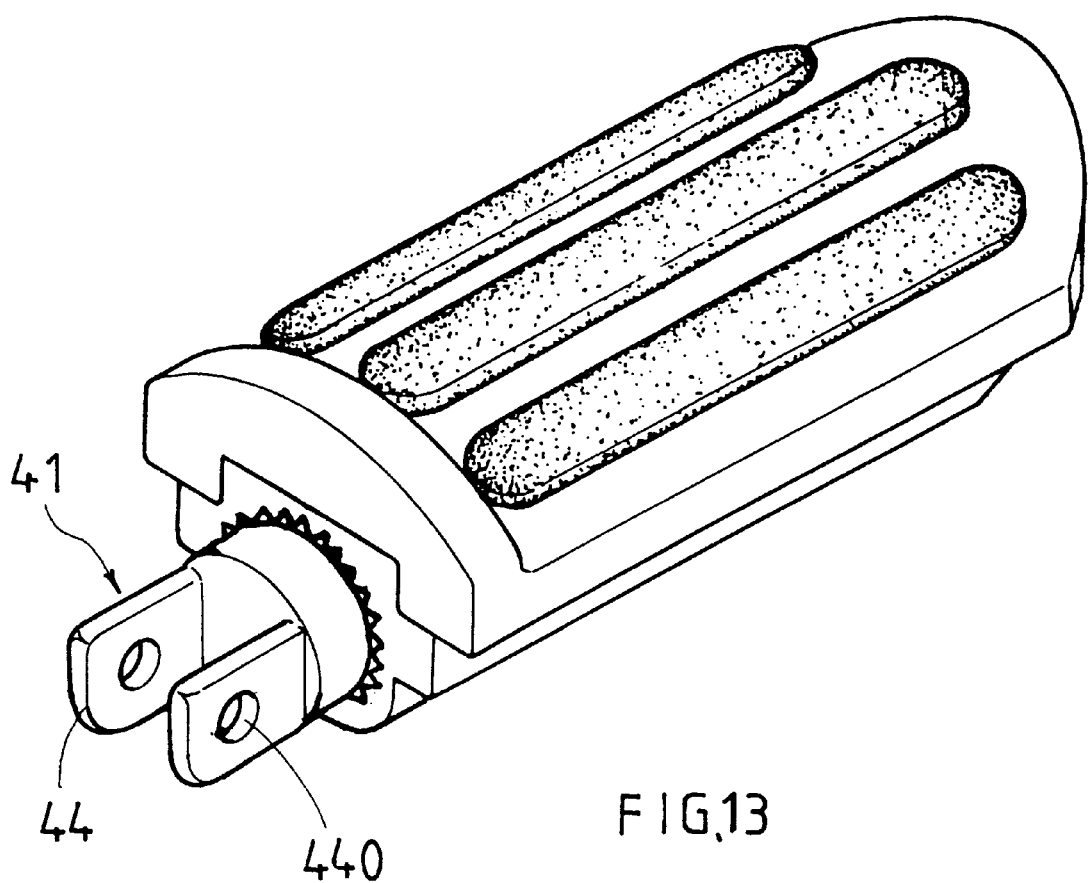
FIG. 13 is a perspective view of the third embodiment of the foot peg in accordance with the present invention.

FIG. 13 shows a third embodiment of the foot peg of the present invention wherein the pull end 41 is composed of two lugs 44 and each of the two lugs 44 has an aperture 440 defined therethrough.

Figure 14:
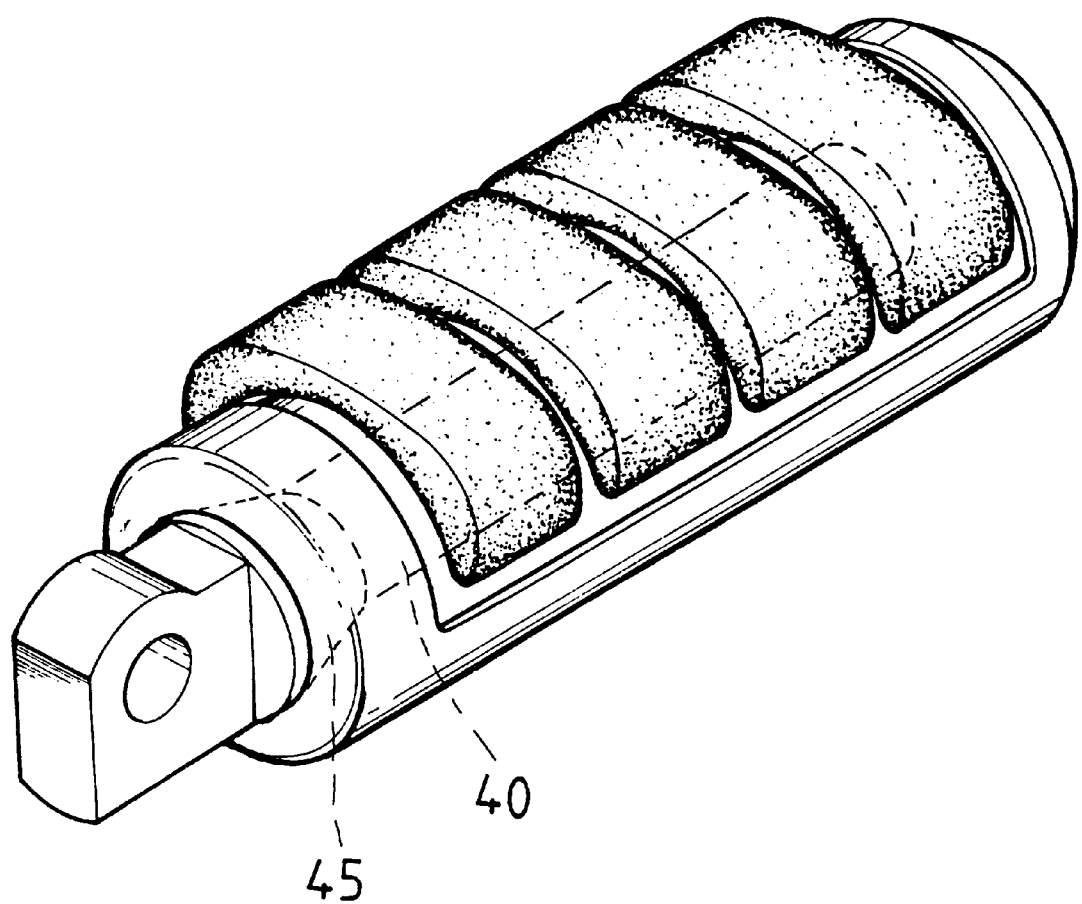
FIG. 14 is a perspective view of the fourth embodiment of the foot peg in accordance with the present invention.
Figure 15:
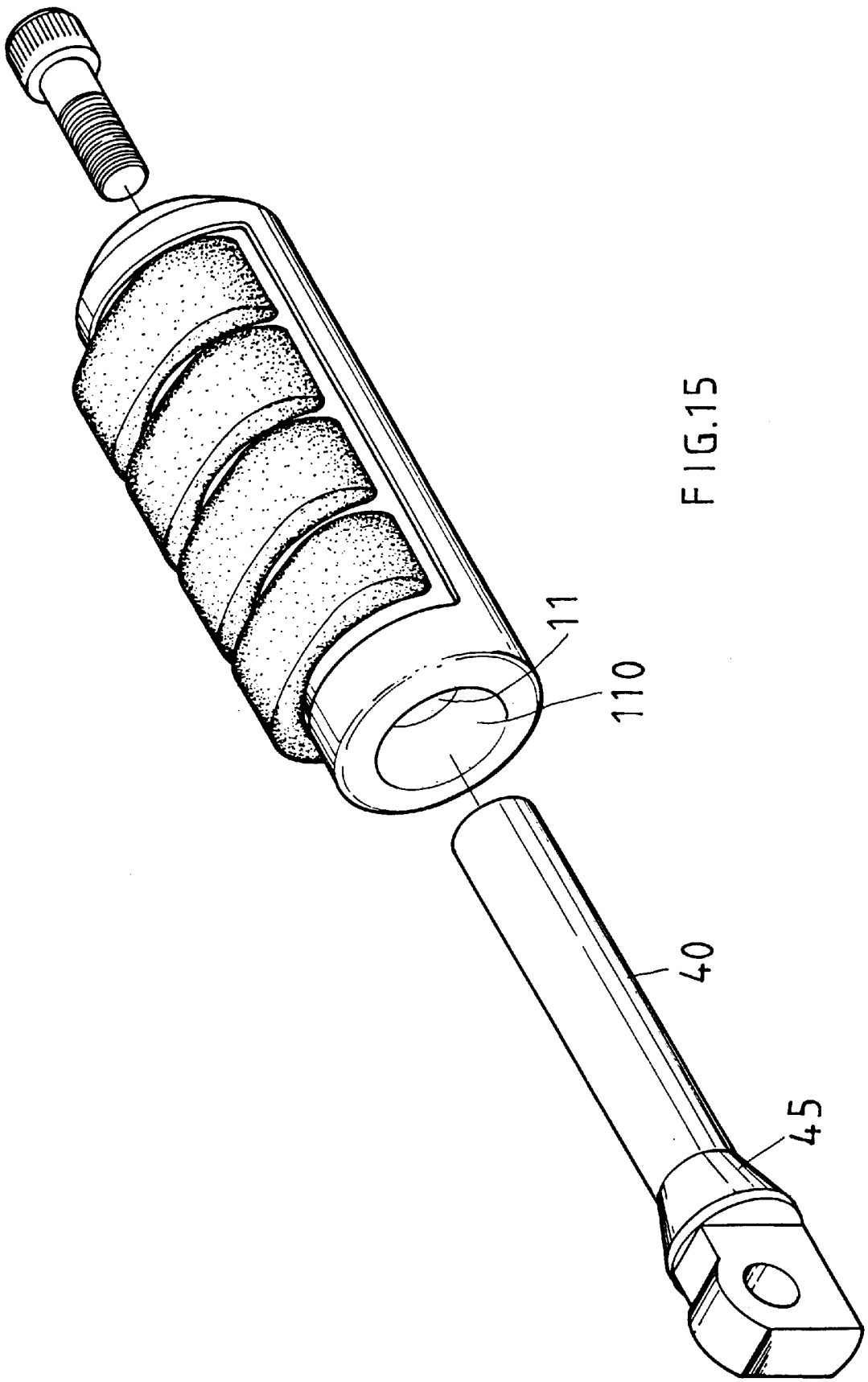
FIG. 15 is an exploded view of the foot peg as shown in FIG. 14 in accordance with the present invention.

FIGS. 14 and 15 show a fourth embodiment of the foot peg of the present invention wherein the shaft 50 has a tapered flange 52 extending radially outward from the first end thereof and the periphery defining the passage 11 having a tapered portion 110 defined in the first end thereof so as to engage with the tapered flange 45 of the shaft 40.

Accordingly, the friction member 30 of the foot peg of the present invention can be easily replaced and the angle of the foot peg relative to the ground is also adjusted. Furthermore, the inclined end 12 effectively prevents the impact between the foot peg and the ground when the motorcycle turns.

While we have shown and described various embodiments in accordance with the present invention, it should be clear to those skilled in the art that further embodiments may be made without departing from the scope and spirit of the present invention.

What is claimed is:

1. A foot peg comprising:

a base member having a passage defined longitudinally therethrough for a shaft inserted therein, said base member having two grooves in two sides thereof;

a cover securely mounted to a top of said base member and having a plurality of slots defined therethrough, said cover having two side walls and each of said side walls having a rail extending laterally inward therefrom, and a friction member received between said base member and said cover, said friction member having a plurality of ribs extending from a top thereof and said ribs extending through said slots of said cover, said friction member supported on said base member by said rails of said cover which are received in said grooves .

2. The foot peg as claimed in claim 1, wherein said base member has an inclined end.

3. The foot peg as claimed in claim 2, wherein said shaft has a tapered flange extending radially outward from a first end thereof, a periphery defining said passage of said base member having a tapered portion defined in a first end thereof so as to engage with said tapered flange of said shaft.

4. The foot peg as claimed in claim 3, wherein said shaft has a threaded recess defined in a second end thereof so as to engage with a bolt extending from said inclined end of said base member.

5. The foot peg as claimed in claim 2, wherein said shaft has a tapered toothed flange extending radially outward from a first end thereof, a periphery defining said passage of said base member having a tapered toothed portion defined in a first end thereof so as to engage with said tapered toothed flange of said shaft.

6. The foot peg as claimed in claim 5, wherein said shaft has a threaded recess defined in a second end thereof so as to engage with a bolt extending from said inclined end of said base member.

7. The foot peg as claimed in claim 1, wherein said shaft has a pull end extending longitudinally from the first end thereof and said pull end has an aperture defied therethrough.

8. The foot peg as claimed in claim 7, wherein said pull end comprises two lugs and each of said two lugs has an aperture defined therethrough.

* * * * *